(12) United States Patent
Abe

(10) Patent No.: US 6,771,883 B2
(45) Date of Patent: Aug. 3, 2004

(54) DEVICE AND METHOD FOR CONTROLLING TAPE TRAVELLING SPEED AND MEDIUM FOR RECORDING ITS CONTROL PROGRAM

(75) Inventor: Masahiro Abe, Daito (JP)

(73) Assignee: Funai Electric Co., Ltd., Daito (JP)

( * ) Notice: Subject to any disclaimer, the term of this patent is extended or adjusted under 35 U.S.C. 154(b) by 585 days.

(21) Appl. No.: 09/760,755

(22) Filed: Jan. 17, 2001

(65) Prior Publication Data

US 2001/0008573 A1 Jul. 19, 2001

(30) Foreign Application Priority Data

Jan. 17, 2000 (JP) .............................................. 2000-291

(51) Int. Cl.[7] ........................... H04N 5/91; G11B 15/46
(52) U.S. Cl. ...................... 386/68; 386/80; 360/73.02
(58) Field of Search .............................. 386/46, 68, 67, 386/80, 81; 360/73.01, 73.02, 73.14, 74.2; 242/334.4

(56) References Cited

U.S. PATENT DOCUMENTS 5,019,924 A * 5/1991 Takai et al. ............... 360/73.14
5,275,351 A * 1/1994 Wu et al. ................. 242/334.4
5,356,088 A * 10/1994 Fujisawa et al. .............. 360/71

FOREIGN PATENT DOCUMENTS

JP        08-77657        3/1996

* cited by examiner

Primary Examiner—Huy Nguyen
(74) Attorney, Agent, or Firm—Crowell & Moring LLP

(57) ABSTRACT

The travelling speed of a magnetic tape is controlled without considering a detection error caused by the slackening of a magnetic tape or the like. A microcomputer 10, immediately after starting a fast-feeding operation, starts a running rotation of feeding and winding reels 44, 45 (step S205), calculates an N value based on reel pulses and sets an acceleration target (step S210, S215) and simultaneously reads the N value immediately before the previous stop of the rotation from RAM and compares the read N value with the current N value (step S225, S230), prohibits the acceleration of the feeding and winding reels 44, 45 after confirming that the error does not fall within 25% (step S235) whereby when the videotape is rotated to the leader or the trailer, the videotape is prevented from being applied with an excessive load so that damages on the videotape can be reduced.

7 Claims, 7 Drawing Sheets

DEVICE AND METHOD FOR CONTROLLING TAPE TRAVELLING SPEED AND MEDIUM FOR RECORDING ITS CONTROL PROGRAM

BACKGROUND OF THE INVENTION

1. Field of the Invention

The present invention relates to a device and a method for controlling tape travelling speed and a medium for recording its control program that detect the rotational state of a tape reel for making a magnetic tape travel and control the travelling speed of the magnetic tape in response to the detected rotational state of the tape reel.

2. Description of the Related Art

Conventional tape travelling speed control devices are disclosed in Japanese Unexamined Patent Prepublications H4-103059 and S59-107444, in which, to shorten the time necessary for fast-feeding and rewinding of the tape, the former performs the judgement in the vicinity of a leader and a trailer of a magnetic tape so as to reduce the tape travelling speed at the leader and the trailer of the magnetic tape while enhancing the entire tape travelling speed; the latter controls the tape travelling speed step by step.

The conventional tape travelling speed control devices, however, detect the tape travelling speed in controlling the travelling speed of the magnetic tape without taking a detection error caused by slackening of the magnetic tape or the like into account.

Accordingly, when the magnetic tape is in such abnormal travelling state as being slackened, until the slackening of the magnetic tape is resolved and the magnetic tape returns to the normal travelling state, the accurate tape travelling speed cannot be detected. This causes an erroneous speed control that causes the tape reel to rotate up to the leader or the trailer of the magnetic tape while keeping elevated rotational speed. This applies an excessive load to the magnetic tape in the state that the magnetic tape is stretched at the leader or the trailer, damaging the magnetic tape to destroy its durability.

SUMMARY OF THE INVENTION

The present invention has been made in view of the above situation and it is an object of the invention to provide a tape travelling speed control device which can reduce damages on a magnetic tape by preventing an excessive load from being applied to the magnetic tape when the magnetic tape is not in the normal travelling state.

A tape travelling speed control device provided by the present invention is equipped with a supply reel pedestal to drive a supply reel and a winding reel pedestal to drive a winding reel, both used for a videotape, and having:

rotation detection elements for outputting reel pulses when the supply reel pedestal and the winding reel pedestal are rotated at a predetermined angle respectively, RAM for storing a ratio of intervals of the reel pulses outputted by the respective rotation detection elements, and a CPU for controlling the tape travelling speed by calculating the ratio between the intervals, controlling to store the ratio to the RAM, comparing the ratio detected before the tape is stopped with the ratio after the tape is traveled, and determining that the ratio is correct when an error of the ratios is smaller than a threshold.

That is, a tape travelling speed control device is designed to have:

a reel rotational state detection unit for detecting a rotational state of a tape reel for making a magnetic tape travel, a reel rotational state storing unit for storing a rotational state of the tape reel detected by said reel rotational state detection unit at appropriate times, and a tape travelling speed control unit for comparing the stored rotational state with the latest rotational state and controlling the travelling speed of said magnetic tape in accordance with whether the rotational state falls within a normal range based on a difference between the stored rotational state and a current rotational state In the present invention having the constitution, the reel rotational state detection unit detects the rotational state of the tape reel for making the magnetic tape travel and the tape travelling speed control unit compares the rotational state of the tape reel which is detected by the reel rotational state detection unit at appropriate times and is stored by the reel rotational state storing unit with the latest rotational state. Then, the tape travelling speed control unit controls the travelling speed of the magnetic tape on the basis of whether the comparison result of the rotational state falls in a normal range or not based on a difference between the moments in the stored rotational state and a current rotational state.

As explained above, the present invention can provide the tape travelling speed control device which can reduce the damages on the magnetic tape by preventing an excessive load being applied to the magnetic tape when the magnetic tape is not in the normal travelling state.

As an example of the rotational state detected at appropriate time stated here, the reel rotational state storing unit is constituted to store the rotational state of the tape reel which is detected by the reel rotational state detection unit immediately before the magnetic tape has previously stopped.

In the constitution, the rotational state of the tape reel detected immediately before the magnetic tape has previously stopped is compared with the latest rotational state.

That is, immediately before the magnetic tape has previously stopped, the magnetic tape is usually travelling in the normal state so that there is no possibility that the magnetic tape is slackened whereby the reel rotational state detection unit detects the normal rotational state.

On the other hand, making the stopped magnetic tape travel again, since a tape reel, when stopped, tends to rotate excessively due to the inertial force, causes the magnetic tape to be frequently slackened, preventing normal rotational state from being detected until the slackening of the magnetic tape is resolved.

Accordingly, when the rotational state detected immediately before the stop and the latest rotational state are compared, if the difference between the rotational states does not fall within a predetermined range, it is judged that the normal rotational state cannot be detected since the slackening of the magnetic tape remains; If within the predetermined range, judged that the slackening of the magnetic tape is resolved, namely the normal rotational state is detected.

Due to the constitution, when the magnetic tape is made to travel again after the stop, the execution of the unintentional speed control can be prevented.

In this manner, as the rotational state detected at appropriate times, storing the rotational state detected immediately before the stop of the previous rotational state and using the rotational state for comparison, even when the slackened magnetic tape is started rotating, detection based on the rotational state in the normal travelling immediately before the stop usefully prevents the unintentional speed control. However, this merely constitutes one example.

A case in which the tape travelling speed of the magnetic tape is controlled based on the result of comparison with the rotational state stored in the normal travelling is not limited to the case in which the magnetic tape is made to travel again after the magnetic tape is stopped. For example, the case may include a case in which when the tape travelling speed control unit executes an abnormal control, the control is executed by comparing with the normal rotational state immediately before the execution of the abnormal control or a case in which when the deflection is generated on the travelling magnetic tape, the control may be executed based on the comparison with the normal rotational state immediately before the generation of the deflection.

Further, the appropriate time is not limited to the case in which the magnetic tape travels in the normal state but includes a case in which the magnetic tape is not in the normal travelling state. For example, in the case that the rotational state detected when the magnetic tape is slackened is stored and then the latest rotational state is detected when the slackening of the magnetic tape is resolved, the difference between the rotational states does not fall within a predetermined range. Here, however, by updating and storing the latest rotational state, the difference falls in the predetermined range in the next comparison. Accordingly, it is confirmed that the normal rotational state is detected and it becomes possible to execute the travelling speed control of the magnetic tape in the usual time.

This prevents the unintentional control in which the tape reel is rotated exceeding the desired rotational speed caused by the travelling speed control of the magnetic tape as usual when it is not confirmed whether the normal rotational state is detected or not, and thereby preventing the magnetic tape from being applied with an excessive load.

Although the reel rotational state storing unit may be constituted so as to store the rotational state as the comparison object, only at predetermined times such as the time immediately before the stop, as mentioned above, and it may also be constituted to store the latest rotational state while sequentially updating the latest rotational state.

As an example of the rotational state described above, the reel rotational state detection unit detects the ratio of rotation between the feeding reel to deliver the magnetic tape and the winding reel to wind the delivered magnetic tape;

the reel rotational state storing unit stores the ratio of rotation detected by the reel rotational state detection unit at appropriate times; and the tape travelling speed control unit compares the ratio of rotation stored in the reel rotational state storing unit with the latest ratio of rotation, and controls the travelling speed of the magnetic tape on the basis of whether a comparison result falls within a normal range based on the difference between the stored rotational state and a current rotational state.

Due to the constitution, the reel rotational state detection unit detects the ratio of rotation between the feeding reel and the winding reel as the rotational state of the tape reel.

Here, the tape travelling speed control unit compares the ratio of rotation stored in the reel rotational state storing unit with the latest ratio of rotation and controls the travelling speed of the magnetic tape on the basis of whether the difference is within the normal range or not based on the difference between the moments in the stored rotational state and a current rotational state.

Due to the constitution, the rotational states of the feeding reel and the winding reel can be compared by succinctly expressing them with a single parameter.

In this manner, the execution of the speed control based on the ratio of rotation between the feeding reel and the winding reel as the tape reels is advantageous since both rotational states of the feeding reel and the winding reel can be succinctly expressed with the single parameter. Such constitution, however, constitutes only one example.

Accordingly, from a viewpoint that it is sufficient for the present invention that the rotational speed of the magnetic tape can be controlled based on the rotational state of the tape reel, it may be possible to treat the rotational speed of the feeding reel and the rotational speed of the winding reel separately. Further, it may be also possible to use the interval of the reel pulses which are synchronous with the rotation of the tape reel as the rotational state.

As a constitutional example of the tape travelling speed control unit, the tape travelling speed control unit sets the acceleration target of the magnetic tape at the time of fast-feeding or rewinding the magnetic tape and compares the rotational state stored by the reel rotational state storing unit and the latest rotational state, and accelerates the magnetic tape up to the set acceleration target only when the difference of the rotational state falls in the normal range based on the difference between the moments in the stored rotational state and a current rotational state.

With the constitution, the tape travelling speed control unit sets the acceleration target of the magnetic tape when the magnetic tape is fast-fed or rewound.

Then, the rotational state stored by the reel rotational state storing unit and the latest rotational state are compared with each other and the magnetic tape is accelerated up to the set acceleration target only when the difference of the rotational state falls in the normal range based on the difference between the moments in the stored rotational state and a current rotational state.

That is, when the tape reel is accelerated to the speed set as the acceleration target in a usual manner without confirming whether the normal rotational state is detected or not, there is a possibility that the tape reel is accelerated exceeding the desired rotational speed and an excessive load is applied to the magnetic tape.

Accordingly, when the difference of the rotational state does not fall in the normal range based on the difference between the moments in the stored rotational state and a current rotational state, the magnetic tape based on the set acceleration target is not accelerated such that the magnetic tape is made to travel at a constant speed without executing the acceleration or the like.

Due to the constitution, at the time of performing the fast-feeding or the rewinding, the tape reel is prevented from being accelerated and hence, the magnetic tape is prevented from being applied with an excessive load.

DESCRIPTION OF THE PREFERRED EMBODIMENT

Embodiments of the present invention have been explained hereinafter in conjunction with the drawings.

Figure 1:
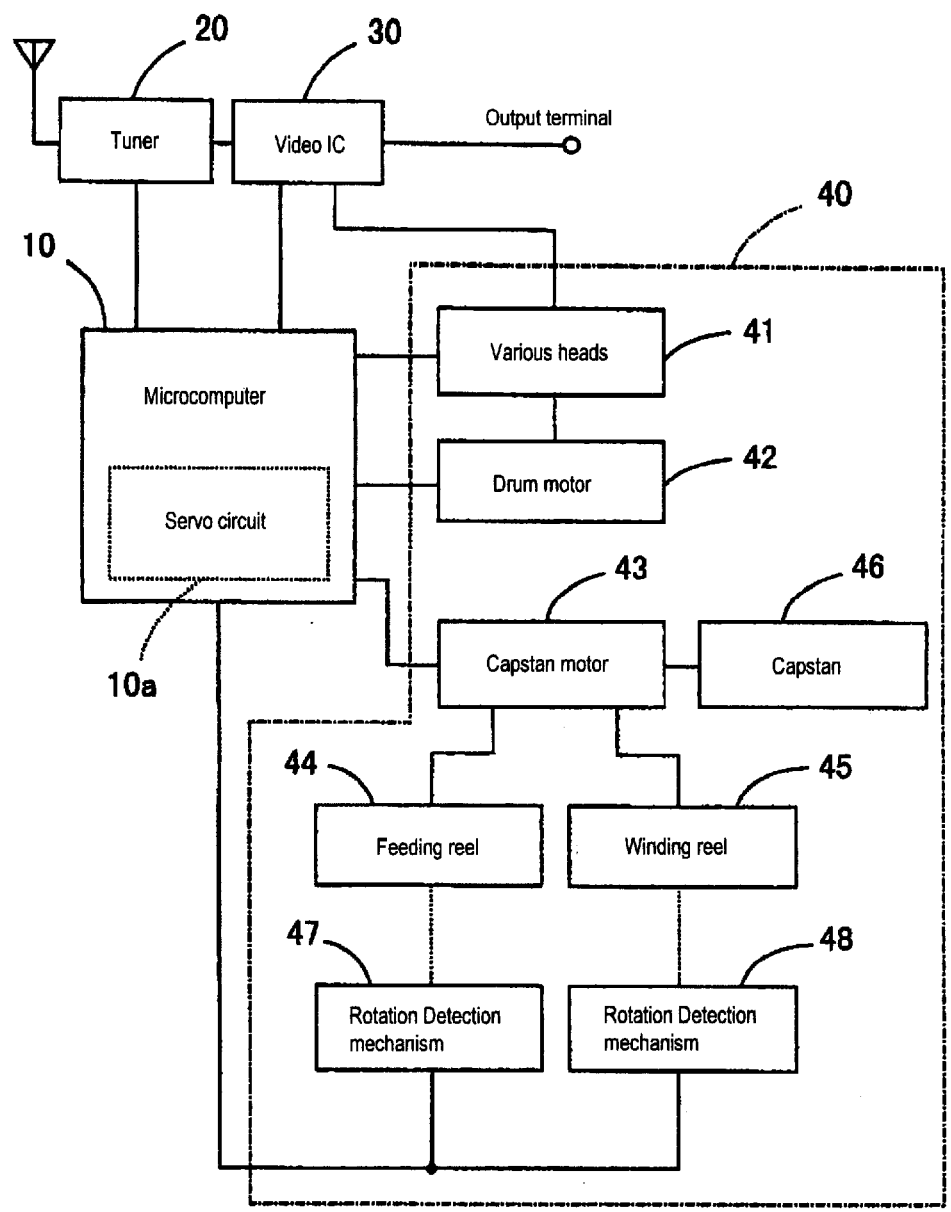
FIG. 1 is a block diagram showing the main constitution of a video deck according to one embodiment of the present invention.

FIG. 1 shows a main constitution of a video deck to which a tape travelling speed control device of one embodiment of the present invention is applied by a block diagram.

As shown in the drawing, the tape travelling speed control device is provided with a microcomputer 10 having a predetermined programming executing environment. A tuner 20, a video IC 30 and a tape mechanism 40 are connected to the microcomputer 10. The inside of the microcomputer 10 are provided with a CPU 10a which executes various judgements, a ROM 10b to which programs and data are written, RAM 10c which is used for temporarily storing variables or the like, an I/O port 10d which is used for transaction of control signals with external parts and the like. Although it is the CPU 10a which executes the control, for convenience, the explanation is hereinafter made such that the microcomputer 10 executes the control.

The tuner 20 receives the corresponding television broadcasting on the basis of the receiver frequency instructed by the microcomputer 10 and outputs broadcasting signals to the video IC 30 after a predetermined signal processing. Further, the video IC 30 produces video signals for videotape recording on the basis of broadcasting signals inputted from the tuner 20 and also produces video signals and sound signals to be outputted from an output terminal on the basis of video signals reproduced from the videotape.

The tape mechanism 40 includes a head system unit for performing recording/reproduction of video signals to the videotape and a tape drive system unit for making the videotape travel.

Figure 2:
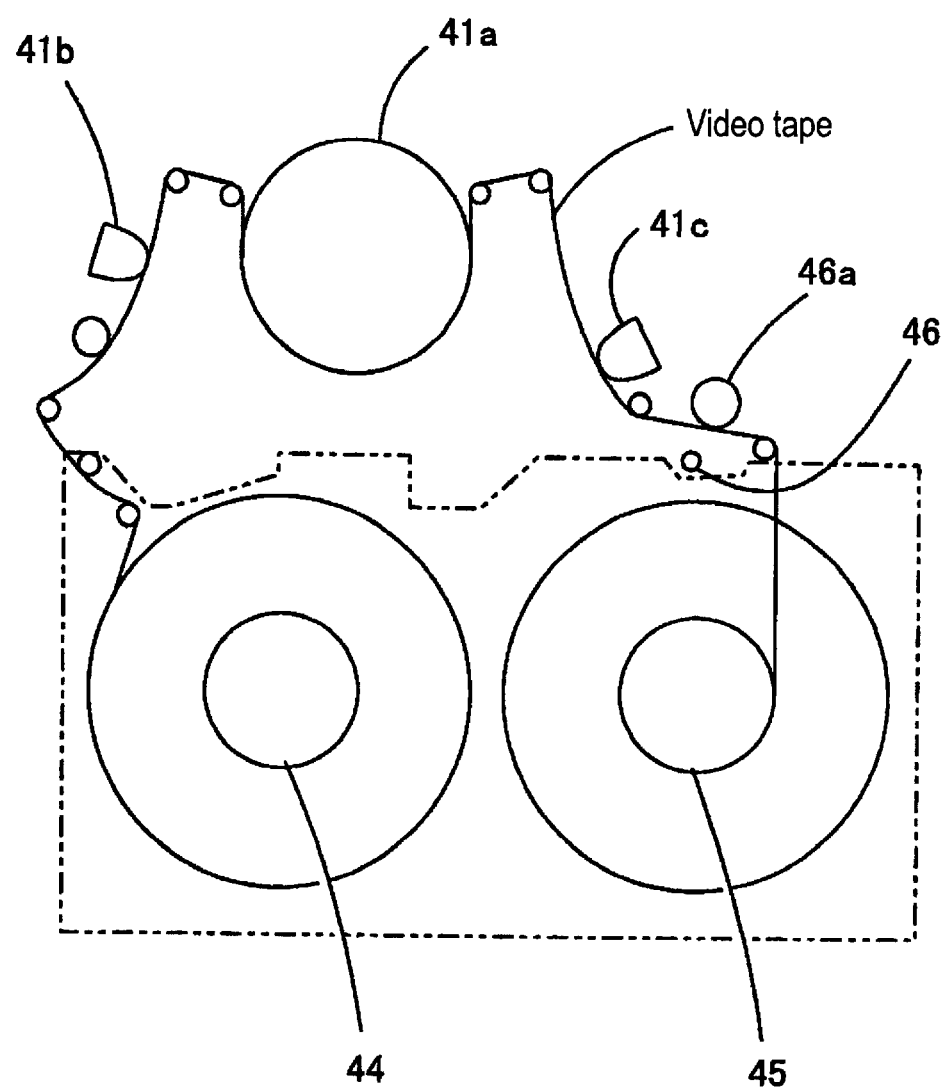
FIG. 2 is a typical view showing the specific constitution of a tape mechanism.

The head system unit includes, as shown in FIG. 2, various heads such as a head cylinder 41a, a full erase head 41b and an AC head 41c. Respective heads 41a–41c are connected to the video IC 30 and perform the transmission/reception of the video signals with the video IC 30.

The tape mechanism 40 includes various motors such as a drum motor 42 which can be rotatably driven on the basis of drive control signals from a servo circuit 10e provided in the microcomputer 10, a capstan motor 43 and a loading motor (not shown in the drawing). Among these motors, the drum motor 42 rotatably drives the head cylinder 41a provided on the head system unit.

On the other hand, the tape drive system unit is provided with a feeding reel pedestal 44, a winding reel pedestal 45 and a capstan 46 which are rotatably driven by the capstan motor 43. The videotape delivered from the feeding reel pedestal 44 is wound by the winding reel pedestal 45 while the videotape is nipped between the capstan 46 and the pinch roller 46a, and is made to travel at a predetermined speed.

Rotation detection elements 47, 48, which are turned on or off on the basis of magnets each are arranged at the feeding reel pedestal 44 and the winding reel pedestal 45, detect reel pulses every time respective reels are rotated predetermined angles and output the reel pulses to the microcomputer 10.

Then, the microcomputer 10 calculates N values on the basis of the reel pulses detected by respective rotation detection elements 47, 48. That is, as shown in FIG. 3, when the microcomputer 10 detects that the reel pulses are detected by the rotation detection element 47 arranged at the feeding reel pedestal 44 side and the reel pulses are detected by the rotation detection element 48 arranged at the winding reel pedestal 45 side (steps S100, S110), the ratio of rotation A/B can be calculated as the N value by dividing the rotational speed A of the feeding reel pedestal 44 by the rotational speed B of the winding reel pedestal 45 (step S120).

Figure 4:
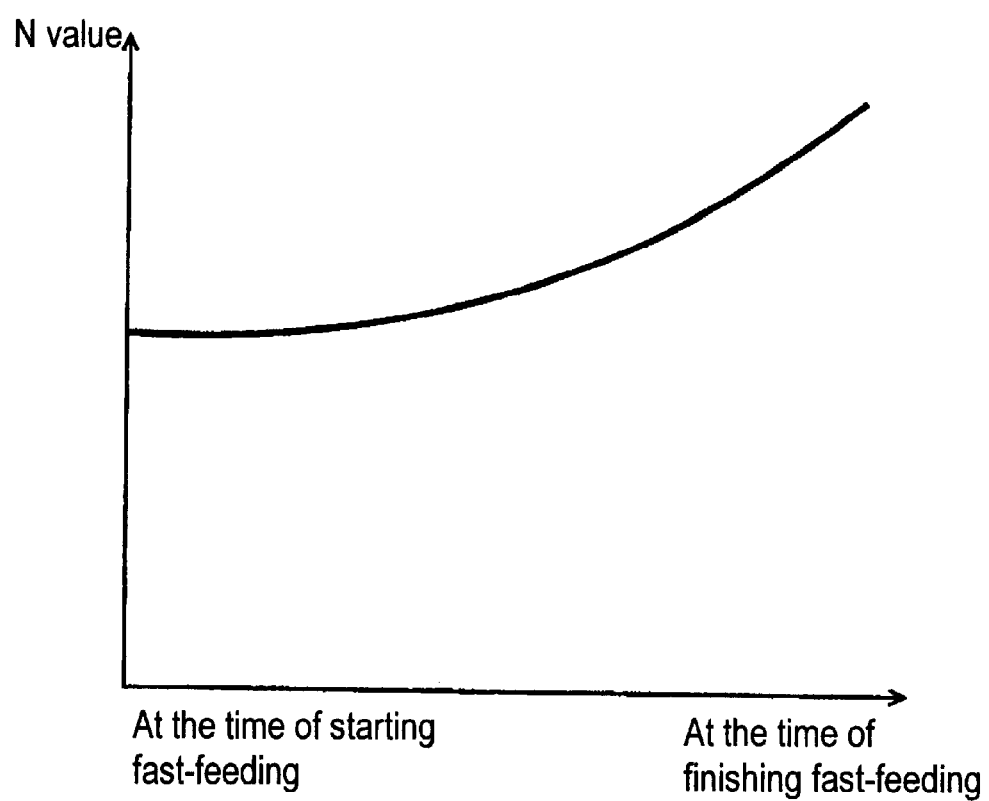
FIG. 4 is a graph showing the change of the N value at the time of fast-feed manipulation.

For example, when the fast-feeding is started, corresponding to the increase of a tape quantity wound by the winding reel pedestal 45, as shown in FIG. 4, the N value is gradually increased. Accordingly, the travelling position of the videotape can be obtained based on the calculated N value. Eventually, by performing the drive control of the capstan motor 43 corresponding to the obtained traveled position of the videotape, it becomes possible to control the rotational speeds of the feeding reel pedestal 44 and the winding reel pedestal 45.

Here, the procedure of the reel rotation control executed when the microcomputer 10 performs the fast-feeding manipulation is explained with reference to FIG. 5 and FIG. 6.

Figure 3:
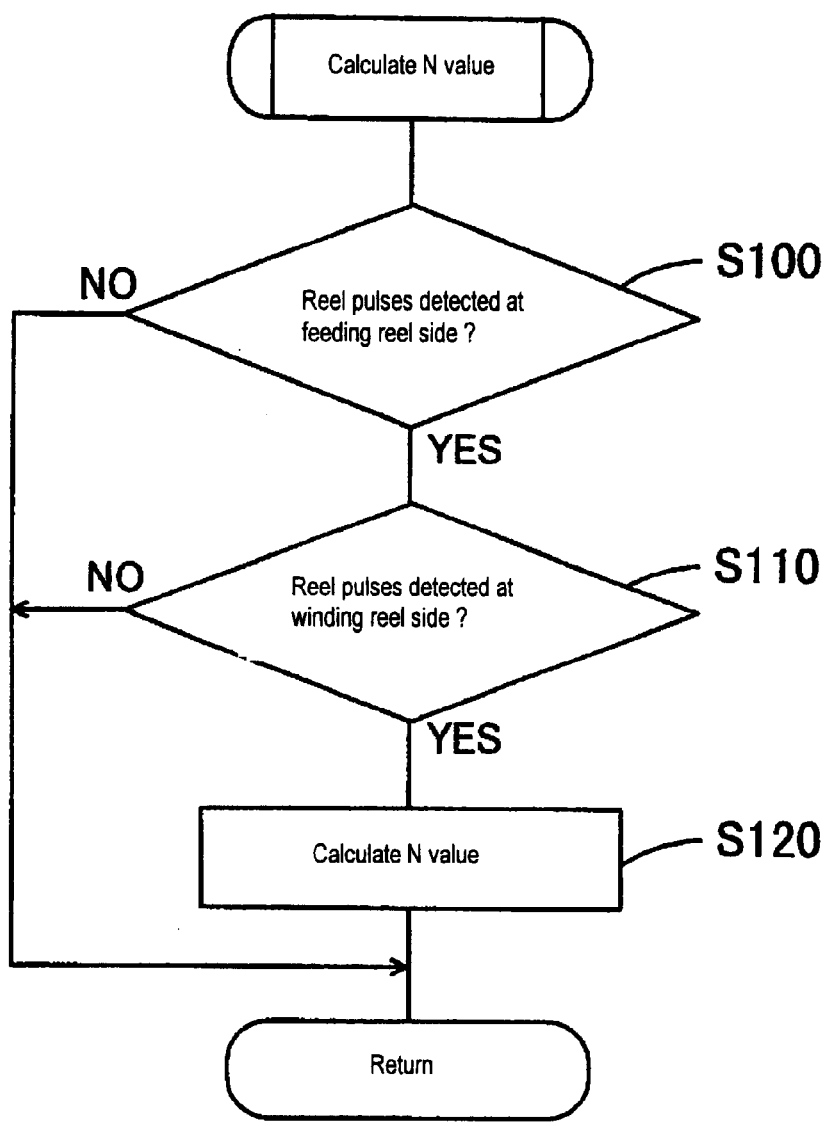
FIG. 3 is a flowchart showing the procedure at the time of calculating the N value.

Upon detection of the instruction of the fast-feed manipulation (step S200), the running rotations of the feeding reel pedestal 44 and the winding reel pedestal 45 are started (step S205) and the microcomputer 10 calculates the N value in accordance with the above-mentioned procedure shown in FIG. 3 (step S210). Then, the traveled position of the videotape is obtained based on this calculated N value and the acceleration target is set (step S215).

Here, the microcomputer 10 judges whether the N value which is calculated immediately before the stop manipulation of the previous rotational state is stored in the RAM 10c mounted on the microcomputer 10 or not (step S220). If the N value is stored in the RAM 10c, the N value immediately before the stop of the previous rotational state is read and is compared with the current N value (steps S225, S230). The RAM 10c to which the N value is stored may be substituted by an EEPROM or the like connected to the microcomputer.

Here, the reason for comparing the N value immediately before the stop of the previous rotational state and the current N value is that there is a possibility that the current N value is not indicating the actual value.

That is, when the feeding reel pedestal 44 or the winding reel pedestal 45 is driven by inertial force at the stop of the previous rotational state, especially when the feeding reel pedestal 44 or the winding reel pedestal 45 is stopped after the fast-feeding operation or the rewinding operation, the videotape is largely slackened. Accordingly, at the time of running rotation, the normal rotational drive is started after the slackening of the videotape generated at the stop of the previous rotational state is removed and hence, causing the N value to be deviated from the actual value.

Accordingly, the N value which is calculated at the time of normal travelling having no slackening of the videotape, that is, immediately before the stop of the previous rotational state, is compared with the current N value and if the current N value is largely deviated from the N value immediately before the stop of the previous rotational state, it is judged that the current N value is not the normal value.

To be more specific, the error between the current N value and the N value immediately before the stop of the previous rotational state is not within 25%, it is judged that the current N value is not the normal value and irrespective of the set acceleration target, the accelerations of the feeding reel pedestal 44 and the winding reel pedestal 45 are prohibited (step S235).

Then, by repeating the above-mentioned steps S200–S225 while performing the running rotation, the slackening of the videotape is resolved and the above-mentioned error falls within 25%. Accordingly, it is judged that the current N value is the normal value, that is, the N value calculated in the state that the videotape has no slackening and the feeding reel pedestal 44 and the winding reel pedestal 45 are accelerated up to the set target speed (step S240).

Accordingly, an excessive load which is applied to the videotape, caused by the phenomenon that the feeding reel pedestal 44 and the winding reel pedestal 45 are accelerated in the state that the videotape has the slackening, can be prevented so that the damages on the videotape can be reduced.

Upon detection of the instruction of the stop manipulation after the fast-feeding is performed to a predetermined tape position (step S245), the N value immediately before the stop is stored in the above-mentioned RAM 10*c* (step S250) and the capstan motor 43 is stopped so as to stop the rotations of the feeding reel pedestal 44 and the winding reel pedestal 45 (step S255).

Accordingly, the microcomputer 10 which controls the rotational speeds of the feeding reel pedestal 44 and the winding reel pedestal 45 by calculating the N value on the basis of the reel pulses, stores the N value immediately before the stop, compares the stored N value and the current N value and prohibits the accelerations of the feeding reel pedestal 44 and the winding reel pedestal 45 when the error exceeds 25%. The microcomputer 10, in this context, constitutes the reel rotational state detection unit, the reel rotational state storing unit and the tape travelling speed control unit of the present invention.

Although only the N value immediately before the stop of the previous rotational state is used as the comparison object, such a constitution is merely one example. It is possible to execute the above-mentioned reel control by using the N value calculated when the slackening of the videotape is resolved at the time of running rotation as a new comparison object.

Figure 5:
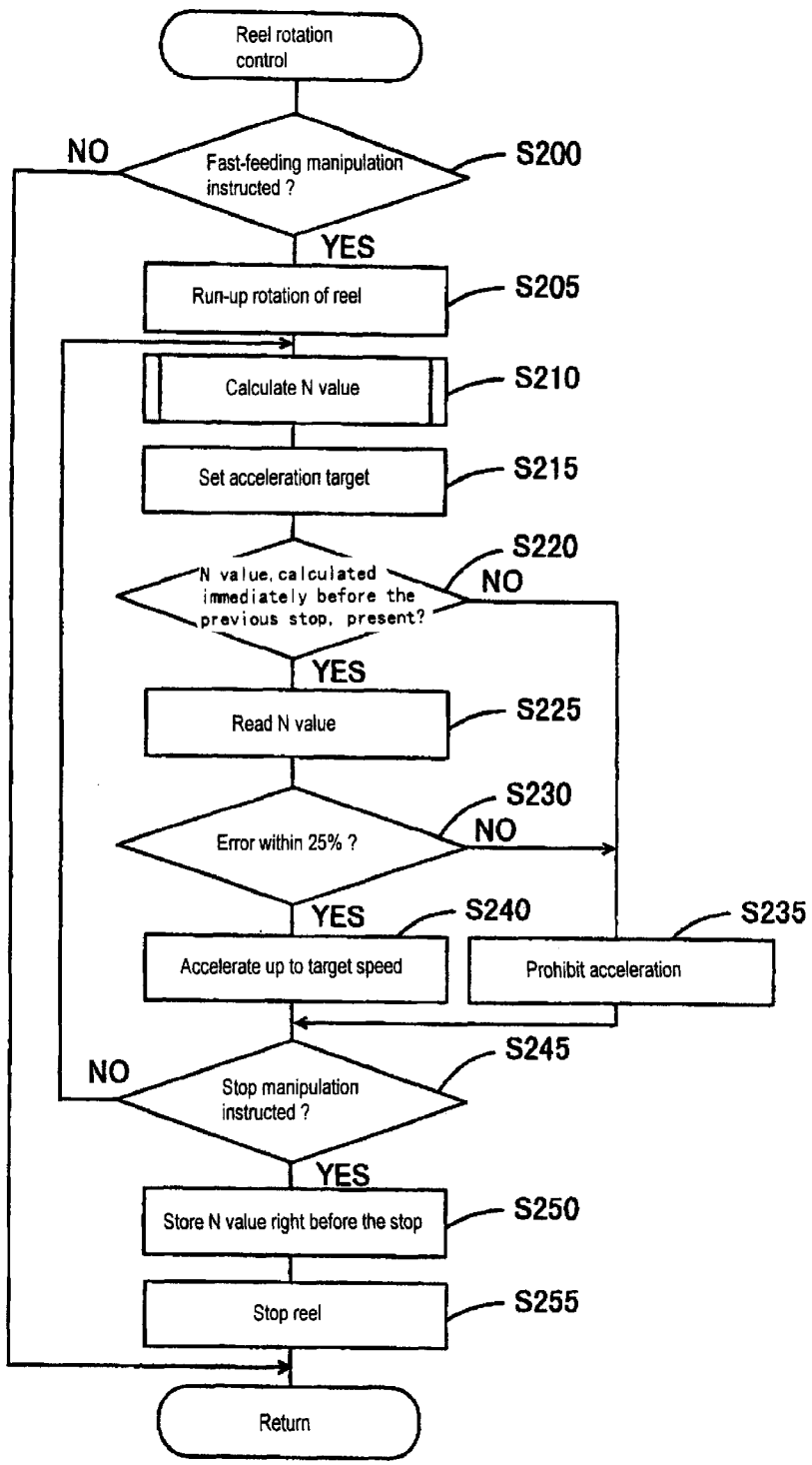
FIG. 5 is a flowchart showing the procedure of a reel rotation control executed by a microcomputer.
Figure 6:
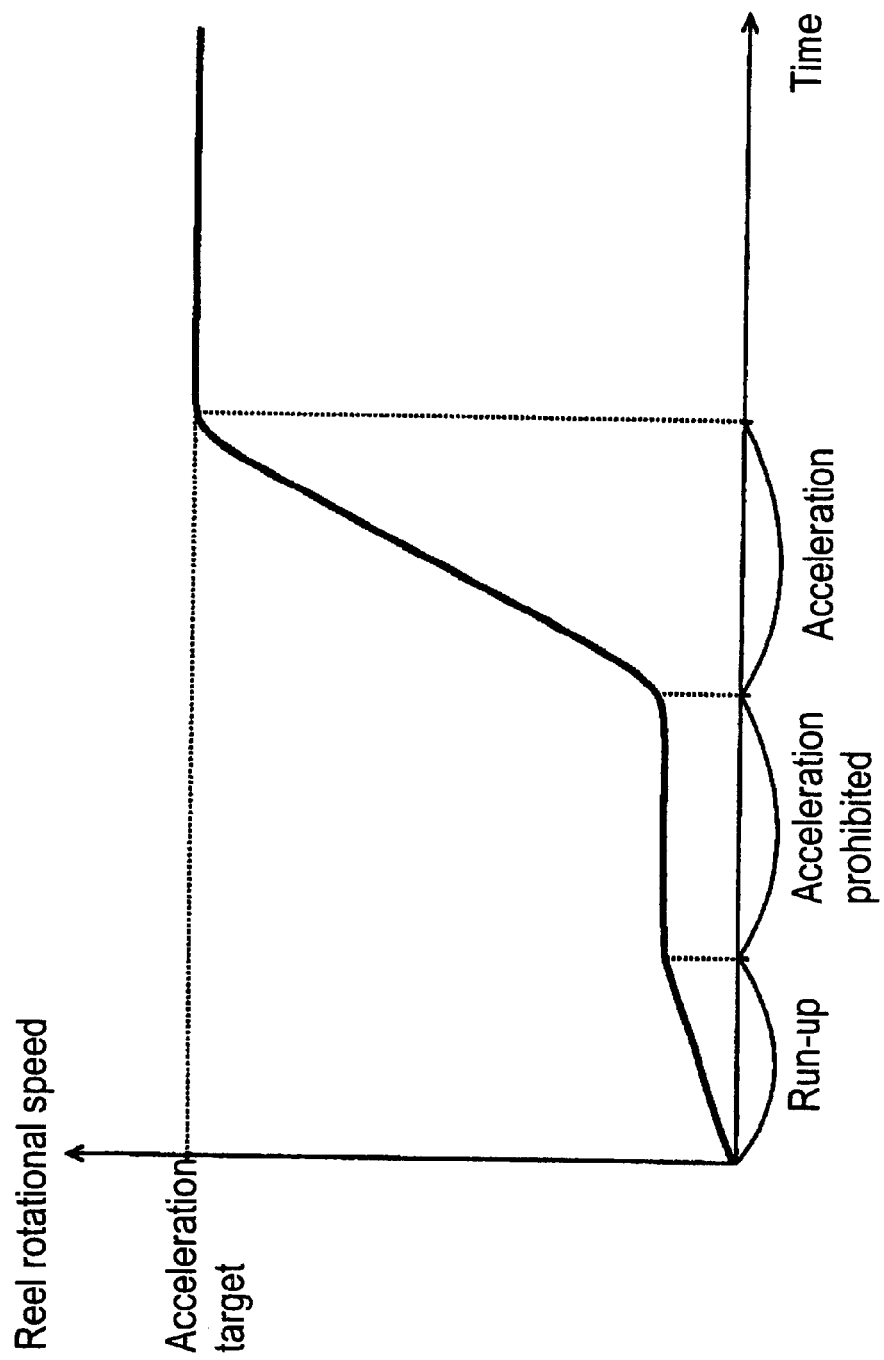
FIG. 6 is a graph showing the change of the reel rotational speed at the time of fast-feed manipulation.
Figure 7:
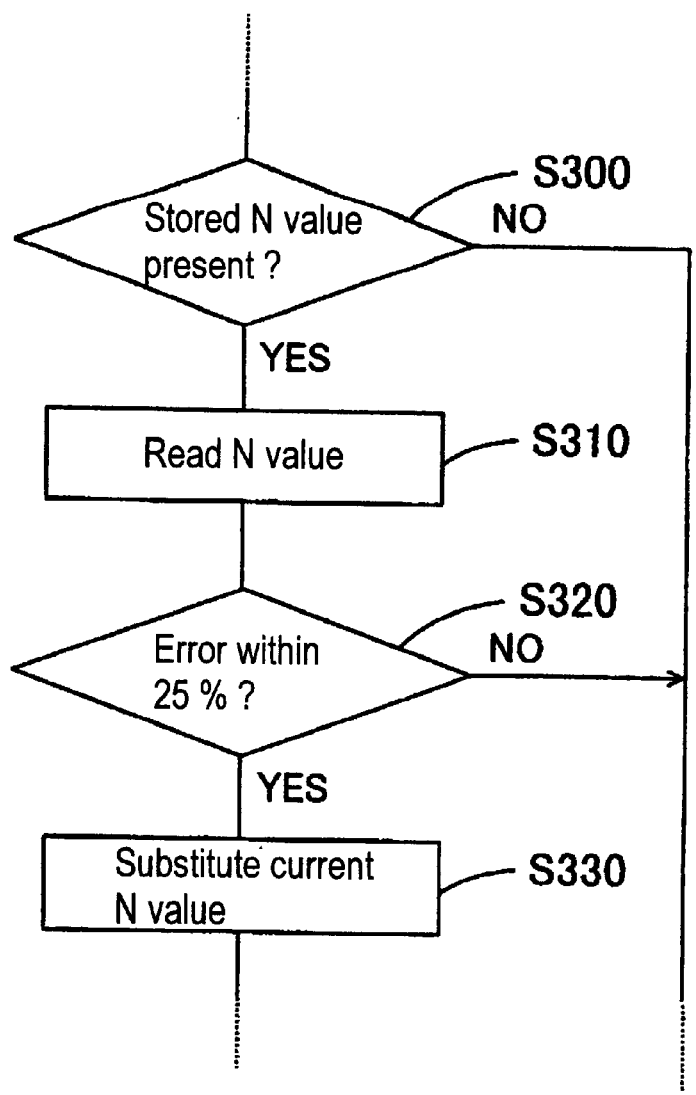
FIG. 7 is a flowchart showing the procedure of the reel rotation control according to a modified example of the embodiment of the present invention.

That is, it may be possible to replace the steps S220–S230 shown in FIG. 5 with steps S300–S330 shown in FIG. 7.

In this case, at that time when the fast-feeding is started, the N value whose storing is confirmed by the step S300 is the N value immediately before the stop of the previous rotational state as in the case of this embodiment. Accordingly, until the error between the current N value and the N value immediately before the stop of the previous rotational state falls within 25%, the similar processing is executed at the step S310, S320 to the case of this embodiment.

However, when the slackening of the videotape is resolved and the error between the current N value and the N value immediately before the stop of the previous rotational state falls within 25%, the current N value is substituted for the N value stored in the RAM 10*c* as a new comparison object (step S330). Thereafter, until the stop manipulation is performed, the N value is repeatedly updated and the comparison between the N value immediately before the stop of the previous rotational state and the current N value becomes possible. Accordingly, this provision is advantageous in that the comparison of the N values can be performed by using the N value corresponding to the current tape travelling state.

Although the above-mentioned explanation exemplifies the operation for performing the fast-feeding manipulation, such operation merely constitutes one example and hence, the tape travelling speed control device of the present invention is applicable to the rewinding operation in the similar manner. Further, the tape travelling speed control device of the present invention is applicable to the case where the video deck is provided with a high-speed fast-feeding function and a high-speed rewinding function and the acceleration and deceleration of the reels are gradually performed, in the same manner.

In this manner, the tape travelling speed control device of the present invention can control the tape travelling speed in a predetermined procedure so that it is apparent that the device can be effectively used as the tape travelling speed control method. Further, this control is executed in the inside of the microcomputer 10 and a program corresponding to the flowchart shown in FIG. 3, FIG. 5 and FIG. 7 is written in the ROM 10*b* disposed in the inside of the microcomputer 10. Accordingly, the ROM 10*b* constitutes a medium which records the tape travelling speed control program. It is needless to say that the program is applicable to various kinds of mediums which can record the program. If a flash ROM or the like is provided, it is possible to write the program in the flash ROM after suitably rewriting the content of the program.

Subsequently, the operation in which the operation is temporarily stopped after the fast-feeding manipulation and then the fast-feeding manipulation is again performed using the video deck of the embodiment of the present invention, is explained.

In performing the fast-feeding operation with the tape mechanism 40, when a user performs the stop manipulation, the microcomputer 10, upon detection of this stop manipulation (step S245), the N value immediately before the stop of the previous rotational state is stored in the RAM 10*c* (step S250) and the capstan motor 43 is stopped (step S255). As a result, the feeding reel pedestal 44 and the winding reel pedestal 45 are stopped.

Then, when the user again executes the fast-feeding manipulation, the microcomputer 10 detects that this fast-feeding manipulation is performed (step S200) and starts the capstan motor 43 so as to start the running rotation of the feeding reel pedestal 44 and the winding reel pedestal 45 (step S205).

At this time, since the rotation detection elements 47, 48 respectively detect the reel pulses, based on the detected reel pulses, the microcomputer 10 divides the rotational speed A of the feeding reel pedestal 44 by the rotational speed B of the winding reel pedestal 45 and calculates the ratio of rotation A/B as the N value (step S210). Then, based on this calculated N value, the traveled position of the videotape is obtained and the acceleration target is set (step S215).

The microcomputer 10 confirms that the N value calculated immediately before the stop of the previous rotational state is stored in the RAM 10*c* (step S220) and reads the N value immediately before the stop of the previous rotational state and compares this N value with the current N value (steps S225, S230).

Usually, immediately before the stop of the previous rotational state, the feeding reel pedestal 44 or the winding reel pedestal 45 is rotated by inertial force and hence, the videotape is slackened. Until this slackening is resolved and the normal rotational drive is started, the calculated N value is largely deviated from the actual value.

Accordingly, the microcomputer 10 judges that the error between the current N value and the N value immediately before the stop of the previous rotational state does not fall within 25% and, irrespective of existence of the set acceleration target, makes the rotational speed of the capstan motor 43 constant and prohibits the acceleration of the feeding reel pedestal 44 and the winding reel pedestal 45 (step S235).

Although the accelerations of the feeding reel pedestal 44 and the winding reel pedestal 45 are prohibited for a while, when the slackening of the videotape is resolved during the running rotation, the above-mentioned error falls within 25% so that the microcomputer 10 increases the rotational speed of the capstan motor 43. As a result, the feeding reel pedestal 44 and the winding reel pedestal 45 are accelerated to the target speeds (step S240).

When the rotational speeds of the feeding reel pedestal 44 and the winding reel pedestal 45 reach the speeds set as the acceleration targets, the travelling of the videotape is transferred to the constant speed travelling as the usual fast-feeding operation.

Then, when the user performs the stop manipulation, as in the case of the stop of the previous rotational state, the microcomputer 10 stores the N value immediately before the stop of the previous rotational state in the RAM 10c (step S250) and stops the capstan motor 43 so as to stop the rotations of the feeding reel pedestal 44 and the winding reel pedestal 45 (step S255).

As has been described above, the video deck of the present invention is, in addition to the feeding reel pedestal 44 and the winding reel pedestal 45 for driving the feeding reel and the winding reel of the videotape, provided with the rotation detection elements 47, 48 which output the reel pulses when the feeding reel pedestal 44 and the winding reel pedestal 45 are rotated by predetermined angles, the RAM 10c which stores the ratio of intervals of the reel pulses outputted from respective rotation detection elements 47, 48, and the CPU 10a which calculates the ratio of intervals, compares the ratio before the stop of the previous rotational state and the ratio after the traveling by controlling the memory of the ratio to the RAM 10c, and assumes the ratio correct when the error is smaller than the threshold value and controls the tape travelling speed.

Then, the CPU 10a of the microcomputer 10 starts the running operation of the feeding and winding reel pedestals 44, 45 right after starting of the fast-feeding operation (step S205) calculates the N value based on the reel pulses and sets the acceleration target (step S210, S215), reads the N value immediately before the stop of the previous rotational state from the RAM 10c and compares this N value with the current N value (step S225, S230), and prohibits the acceleration of the feeding reel and winding reel pedestals 44, 45 after confirming that the error does not fall within 25% (step S235). Accordingly, when the leader or the trailer of the videotape reaches the feeding reel pedestal 44 or the winding reel pedestal 45, the videotape is prevented from being applied with an excessive load and hence, the damages on the videotape can be reduced.

I claim:

1. A tape travelling speed control device equipped with a supply reel pedestal for driving a supply reel and a winding reel pedestal for driving a winding reel, of a videotape, said device comprising:

rotation detection elements for outputting reel pulses when the supply reel pedestal and the winding reel pedestal are rotated at a predetermined angle respectively, RAM for storing a ratio of intervals of the reel pulses outputted by the respective rotation detection elements, and a CPU for controlling the tape travelling speed by calculating the ratio between the intervals, controlling to store the ratio to the RAM, comparing the ratio detected before the tape is stopped with the ratio detected after the tape is traveled, and determining that the ratio is correct when an error of the ratios is smaller than a threshold value.

2. A tape travelling speed control device comprising:

a reel rotational state detection unit for detecting a rotational state of a tape reel for making a magnetic tape travel, a reel rotational state storing unit for storing a rotational state of the tape reel detected by said reel rotational state detection unit at appropriate times, and a tape travelling speed control unit for comparing the stored rotational state with the latest rotational state and controlling the travelling speed of said magnetic tape in accordance with whether the rotational state falls within a normal range based on a difference between the stored rotational state and a current rotational state, and wherein said reel rotational state detection unit detects the ratio of rotation between the feeding reel for delivering said magnetic tape and the winding reel for winding said delivered magnetic tape as the rotational state;

said reel rotational state storing unit stores the ratio of rotation detected by said reel rotational state detection unit at appropriate times; and said tape travelling speed control unit compares the ratio of rotation stored in said reel rotational state storing unit with the latest ratio of rotation, and controls the travelling speed of said magnetic tape in accordance with whether a comparison result falls within a normal range based on a difference between the stored rotational state and the current rotational state.

3. A tape travelling speed control device according to claim 2, wherein said reel rotational state storing unit stores the rotational state of the tape reel detected immediately before said magnetic tape has previously stopped by means of the reel rotational state detection unit.

4. A tape travelling speed control device according to claim 2, wherein:

said tape travelling speed control unit, when performing the fast-feeding or rewinding of said magnetic tape, sets an acceleration target of said magnetic tape, compares the rotational state stored in said reel rotational state storing unit with the latest rotational state, and accelerates said magnetic tape to said set acceleration target only when the comparison result of the rotational states falls within a normal range based on the difference between the stored rotational state and a current rotational state.

5. A tape travelling speed control device according to claim 3, wherein:

said tape travelling speed control unit, when performing the fast-feeding or rewinding of said magnetic tape, sets an acceleration target of said magnetic tape, compares the rotational state stored in said reel rotational state storing unit with the latest rotational state, and accelerates said magnetic tape to said set acceleration target only when the comparison result of the rotational states falls within a normal range based on the difference between the stored rotational state and a current rotational state.

6. A tape travelling speed controlling method comprising the steps of:

detecting a rotational state of the tape reel for making a magnetic tape travel, wherein the ratio of rotation between a feeding reel for delivering a magnetic tape and a winding reel for winding said delivered magnetic tape is detected as said rotational state, storing the detected ratio of rotation as said rotational state of the tape reel at appropriate times, comparing the stored rotational state with the latest rotational state, including comparing the stored ratio of rotation with a latest ratio of rotation and controlling the travelling speed of said magnetic tape in accordance with whether a comparison result of the rotational states falls within a normal range based on a difference between a stored rotational state and a current rotational state.

7. A medium for recording a tape travelling speed control program in a computer that detects a rotational state of a tape reel for making a magnetic tape travel and controls the traveling speed of the magnetic tape in accordance with the detected rotational state of the tape reel, the program comprising the steps of:

detecting the rotational state of the tape reel for making the magnetic tape travel, wherein the ratio of rotation between a feeding reel for delivering a magnetic tape and a winding reel for winding said delivered magnetic tape is detected as said rotational state, storing the detected ratio of rotation as said rotational state of the tape reel at appropriate times, and controlling the travelling speed of said magnetic tape by comparing the stored ratio of rotation with the latest ratio of rotation, in accordance with whether a comparison result of the rotational states falls within a normal range based on a difference between a stored rotational state and a current rotational state.

* * * * *